United States Patent
Lei et al.

(10) Patent No.: US 11,787,921 B2
(45) Date of Patent: Oct. 17, 2023

(54) CRYSTALLINE ALUMINUM PHOSPHITE, PREPARATION METHOD AND APPLICATION THEREOF

(71) Applicants: JIANGSU LISIDE NEW MATERIAL CO., LTD., Taizhou (CN); ZHEJIANG UNIVERSITY, Hanzhou (CN)

(72) Inventors: Hua Lei, Hangzhou (CN); Jinzhong Li, Taizhou (CN)

(73) Assignees: JIANGSU LISIDE NEW MATERIAL CO., LTD., Taizhou (CN); ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/508,200

(22) Filed: Oct. 22, 2021

(65) Prior Publication Data

US 2022/0127434 A1   Apr. 28, 2022

(30) Foreign Application Priority Data

Oct. 22, 2020  (CN) .......................... 202011140842.9
Jan. 19, 2021  (CN) ......................... 202110068756.X

(51) Int. Cl.
| | |
|---|---|
| C08K 13/02 | (2006.01) |
| C01F 7/00 | (2022.01) |
| C08K 3/105 | (2018.01) |
| C08K 5/53 | (2006.01) |
| C08K 7/14 | (2006.01) |

(52) U.S. Cl.
CPC ................ *C08K 13/02* (2013.01); *C01F 7/00* (2013.01); *C01P 2002/72* (2013.01); *C01P 2004/60* (2013.01); *C08K 3/105* (2018.01); *C08K 5/53* (2013.01); *C08K 7/14* (2013.01); *C08K 2201/005* (2013.01)

(58) Field of Classification Search
CPC ....................................................... C01F 7/00
See application file for complete search history.

(56) References Cited

U.S. PATENT DOCUMENTS

2015/0299419 A1* 10/2015 Bauer ...................... C08K 3/32
524/414

FOREIGN PATENT DOCUMENTS

CN           111661830 A  *  9/2020

* cited by examiner

*Primary Examiner* — Wenwen Cai
(74) *Attorney, Agent, or Firm* — Jiwen Chen; Joywin IP Law PLLC

(57) ABSTRACT

The present invention discloses a crystalline aluminum phosphite, a preparation method thereof and an application thereof as or for the preparation of a flame retardant or a flame retardant synergist. The preparation method has the following processes: 1, reacting aluminum hydrogen phosphite with an aluminum-containing compound in water at 80-110° C. to obtain a precipitate in the presence of no strong acid or a small amount of strong acid; 2, washing and filtering the precipitate; 3, drying the precipitate at 100-130° C.; 4, continuously heating the dried solid step by step at a low speed, where the material temperature is increased to not exceeding 350° C. from room temperature at about 5-10 h, with a temperature rise rate not exceeding 5° C./min. Compared with amorphous aluminum hydrogen phosphite, the crystalline aluminum phosphite has a higher thermal decomposition temperature, lower water absorption and weaker acidity, and can be synergistic with diethyl aluminum hypophosphite to achieve better flame retardant property and thus, is used for a halogen-free flame retardant component of high polymer materials.

8 Claims, 2 Drawing Sheets

CRYSTALLINE ALUMINUM PHOSPHITE, PREPARATION METHOD AND APPLICATION THEREOF

This application claims priority to Chinese Patent Applications No. 2020111408429 filed Oct. 22, 2020 and Chinese Patent Applications No. 202110068756X filed Jan. 19, 2021, all of which are hereby incorporated by reference.

TECHNICAL FIELD

The present invention relates to the technical field of materials, and specifically, relates to a crystalline aluminum phosphite, a preparation method and an application thereof.

BACKGROUND TECHNOLOGY

Mesoscopic state of solid matters includes crystalline and amorphous aggregation state. Some matters are crystalline materials, but some are amorphous materials, which is influenced by the chemical composition of the matter. Moreover, the aggregation state is influenced by environmental conditions during preparation, such as, temperature and pressure. Therefore, the same chemical substance may be in a crystalline state, or an amorphous state. The mesoscopic aggregation state of a solid matter will influence the physical and chemical properties, such as, melting point and solubility. Different mesoscopic aggregation state may be selected directed to different application demands.

Due to possessing good flame retardant synergy with diethyl aluminum hypophosphite (e.g., patented technology No. CN107936297A or CN107760023A), low water solubility and low acidity, aluminum phosphite is widely used as a flame retardant synergist at present, and applied in glass fiber reinforced engineering plastics, such as nylon, polyesters and other systems to possess better flame retardance. But aluminum phosphites reported currently are amorphous compounds, and shows certain solubility in physical property and still has certain water absorption and acidity. Therefore, there are several problems in the compounded system: 1) aluminum phosphite has certain solubility; and therefore, the flame retardant easily absorbs water moisture, when aluminum phosphite is used in a polymer, the obtained product also has the risk of moisture absorption, influencing the electrical insulation performance; 2) a certain acidity of aluminum phosphite still has certain adverse impacts on polymers and processing equipment; 3) the thermal decomposition temperature shows slight insufficiency, particularly under the condition of high shear, for example, the system is prone to discoloration at a high content of glass fiber due to a strong shear force. These shortcomings limit the application scope of the flame retardant system.

Through studies, it is found that these shortcomings of aluminum phosphite may be associated with amorphous aggregation structures. To avoid these problems of the aluminum phosphite, an aluminum phosphite with a crystalline structure needs to be set forth. Provided is a synthesis method for preparing a crystalline aluminum phosphite, and an application thereof as a flame retardant synergist in the inflaming retarding of high polymer materials.

SUMMARY OF THE INVENTION

Directed to the shortcomings existing in the prior art, the present invention provides a preparation method of a crystalline aluminum phosphite; the aluminum phosphite compound with such a crystalline structure is obtained as follows: aluminum hydrogen phosphite (unless otherwise specified herein, the aluminum hydrogen phosphite of the present invention has a molecular formula of $(H_2PO_3)_3Al$) is reacted with a specific aluminum-containing compound under certain conditions and then subjected to specific high temperature post-processing. The crystalline aluminum phosphite has a higher thermal decomposition temperature, lower water absorption and lower acidity. Therefore, the crystalline aluminum phosphite may be used as or used in the preparation of a flame retardant and a flame retardant synergist, and thus applied in the inflaming retarding of high polymer materials, for example, the crystalline aluminum phosphite is compounded with diethyl aluminum hypophosphite as a flame-retardant system of glass fiber reinforced engineering plastics.

A preparation method of a crystalline aluminum phosphite comprises the following steps:
(1) preparing an aluminum-containing compound/water mixed solution containing a strong acid or free of a strong acid, then adding the mixed solution to an aluminum hydrogen phosphite solution at 80-110° C. for reaction, and controlling a pH value of a liquid phase to be less than 4 at the end of the reaction; the aluminum-containing compound is at least one of aluminum sulfate, aluminum nitrate, aluminum chloride, aluminum hydroxide and aluminum oxide;
(2) filtering the reacted mixture and washing a precipitate until washing effluent has a conductivity less than 50 µs/cm;
(3) heating and drying the washed precipitate at 100-130° C., such that the precipitate has a water content below 0.3 wt % below;
(4) continuously heating the precipitate for dehydration reaction in an inert atmosphere or under vacuum conditions, with temperature rise not exceeding 350° C. within 5-10 h and temperature rise rate not exceeding 5° C./min, and finally cooling to obtain the crystalline aluminum phosphite.

Unless otherwise specified, solvent of each solution in the present invention is water; the "aluminum-containing compound/water mixed solution" means a mixed system obtained by dispersing an aluminum-containing compound into water.

The preparation method of the present invention may be summarized as:
1, proportionally reacting aluminum hydrogen phosphite with an aluminum-containing compound in water to obtain a precipitate of aluminum hydrogen phosphite in the presence of no strong acid or a small amount of strong acid at 80-110° C., and finally controlling a pH value of a liquid phase to be less than 4. The key point is to use aluminum hydrogen phosphite as a reaction starting material and to control a pH value of a liquid phase to be less than 4 finally in the preparation of a crystalline aluminum phosphite; if other phosphorus-containing compounds are selected, the crystalline aluminum phosphite may not be prepared;
2, washing and filtering the precipitate;
3, drying the precipitate at 100-130° C.;
and 4, continuously heating the dried solid step by step at a low speed, where the material temperature is increased to be not exceeding 350° C. from room temperature at about 5-10 h, with a temperature rise rate not exceeding 5° C./min. The high temperature processing procedure is also a critical step to obtain the crystalline aluminum phosphite, beneficial to the formation of a crystal.

If necessary, the obtained crystalline aluminum phosphite is crushed to a desired particle size.

In the preparation method of the present invention, when the aluminum-containing compound is a water-soluble compound, the reaction needs to be performed in the presence of a strong acid; when the aluminum-containing compound is insoluble in water, the reaction needs to be performed in the presence of no strong acid.

In the step (1), the aluminum-containing compound and the aluminum hydrogen phosphite may be added by an equivalent molar ratio of complete reaction.

In the step (1), preferably:
in a mixed solution obtained by dispersing the aluminum-containing compound into water (the aluminum-containing compound is an aqueous suspension dispersion system when insoluble, and the water-soluble aluminum-containing compound is a solution), the aluminum-containing compound has a mass concentration of 15%-50%;
when the aluminum-containing compound is at least one of aluminum sulfate, aluminum nitrate and aluminum chloride, the aluminum-containing compound/water mixed solution containing a strong acid is prepared; when the aluminum-containing compound is at least one of aluminum hydroxide and aluminum oxide, the aluminum-containing compound/water mixed solution free of a strong acid is prepared;
the strong acid comprises at least one of sulfuric acid, nitric acid, hydrochloric acid and phosphoric acid, and the strong acid is 2%-5% of the mass of the aluminum hydrogen phosphate;
in the aluminum hydrogen phosphite solution, the aluminum hydrogen phosphite has a mass concentration of 15%-50%;
the aluminum-containing compound/water mixed solution is added dropwisely to the aluminum hydrogen phosphite solution, and total reaction time is 1-5 h;
the pH value of the liquid phase is controlled to be less than 4 by addition of an alkali or a metal oxide at the end of the reaction.

The heating and drying in the step (3) may be performed using various kinds of drying ovens, drying chambers, dryers and the like.

The inert atmosphere in the step (4) may be rare gas, nitrogen and other atmosphere.

The present invention further provides a crystalline aluminum phosphite prepared by the preparation method.

It is surprisingly found that the preparation method of the present invention may obtain a crystalline aluminum phosphite having a typical XRD diffraction pattern as shown in FIG. 1; and the specific characteristic/diffraction peak of a crystalline structure can be seen from the XRD diffraction result. Currently, the aluminum phosphite used in the inflaming retarding field has a typical XRD diffraction pattern as shown in FIG. 2; the pattern has no narrow characteristic peak and displays an amorphous aggregation structure.

Comparison of the XRD pattern results indicates that the aluminum phosphite of the present invention is obviously different from the current aluminum phosphite in the aggregation state; and the current aluminum phosphite is an amorphous form; but aluminum phosphite of the present invention is a crystalline form.

The crystalline aluminum phosphite of the present invention and the existing amorphous phosphorous acid are characterized for analysis; and the typical physical properties are shown in Table 1 below.

TABLE 1

|  | 2 wt % weight loss temperature (° C.) | Water absorption (%) | pH value |
|---|---|---|---|
| Crystalline aluminum phosphite | 442 | 0.12 | 3.0 |
| Amorphous aluminum phosphite | 425 | 0.50 | 2.6 |

It can be seen from the results of the table that the crystalline aluminum phosphite of the present invention has a higher weight loss temperature, lower water absorption and weaker acidity; and these advantages are beneficial to the use of aluminum phosphite as a flame retardant. Moreover, through application testing, the crystalline aluminum phosphite is still well synergistic flame retardant to diethyl aluminum hypophosphite. Furthermore, the flame retardant efficiency is improved to some extent relative to amorphous aluminum phosphite.

The amorphous aluminum phosphite in Table 1 is prepared by a current conventional method: based on the following reaction principle, sodium phosphite and aluminum sulfate are prepared into an aluminum phosphite precipitate in an aqueous phase under the condition of certain temperature; the precipitate is separated and dried to obtain the product. But the prepared aluminum phosphite is amorphous; aluminum phosphite with a crystalline structure cannot be still obtained after through various post-processing, thus being incapable of achieving the objective of the present invention.

Through extensive and in-depth studies, the inventor obtains a novel process for preparing a crystalline aluminum phosphite, and the reaction principle is as follows:

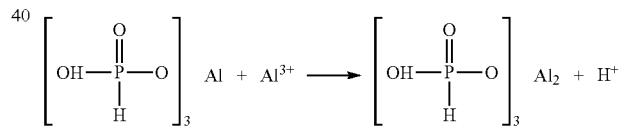

the generated H⁺ may be neutralized by addition of an alkali or a metal oxide, thus controlling the pH value of the final liquid phase to be less than 4;

or reaction is performed with aluminum hydroxide or aluminum oxide; aluminum hydroxide is set as an example herein, and the reaction is performed according to the following formula:

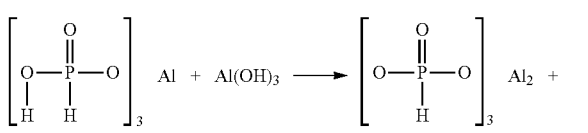

an alkali compound may be added to control the pH value of the final liquid phase to be less than 4.

Meanwhile, the crystalline aluminum phosphite may be obtained in combination with special post-processing technology.

Preferably, the crystalline aluminum phosphite has a particle size of 0.1-1000 μm, a water solubility of 0.01-10 g/L and a bulk density of 80-800 g/L.

The crystalline aluminum phosphite of the present invention has a residual moisture less than 5 wt %.

The present invention further provides an application of the crystalline aluminum phosphite as or for the preparation of a flame retardant or a flame retardant synergist.

The flame retardant or the flame retardant synergist is used for the following uses, comprising:
the inflaming retarding of a varnish or a foaming coat,
the inflaming retarding of timber or a cellulose-containing product, and
the preparation of a flame-retardant polymer molding material, a flame-retardant polymer film, and a flame-retardant polymer fiber.

In a preferred embodiment, the flame-retardant polymer molding material, the flame-retardant polymer film, and the flame-retardant polymer fiber comprise the following ingredients based on 100% by total weight:
55%-99.9% of polymer matrix;
0.1%-45% of crystalline aluminum phosphite;
0-44.9% of filler and/or reinforcing material; and
0-44.9% of additive.

In another preferred embodiment, the flame-retardant polymer molding material, the flame-retardant polymer film, and the flame-retardant polymer fiber comprise the following ingredients based on 100% by total weight:
55%-99.9% of polymer matrix;
0.1%-45% of flame-retardant system;
0-44.9% of filler and/or reinforcing material;
and 0-44.9% of additive.
the flame-retardant system comprises:
0.1%-50% of crystalline aluminum phosphite;
and 50%-99.9% of flame retardant.

The flame retardant is preferably a metal salt of diethyl hypophosphorous acid, and further preferably diethyl aluminum hypophosphite.

The polymer matrix is selected from at least one of nylon, polyesters and POK (polyketone).

The crystalline aluminum phosphite of the present invention may be used for a flame retardant of a varnish or a foaming coating, for a flame retardant of timber and other cellulose-containing products, used as a nonreactive flame retardant for a polymer, used for the preparation of a flame-retardant polymer molding material, used for the preparation of a flame-retardant polymer molding body and/or used for imparting flame retardance to a polyester and pure cellulose fabrics and mixed fabrics through impregnation, and used as a flame retardant mixture and a flame retardant synergist.

The flame retardant thermoplastic or thermosetting polymer molding material, polymer molding body, polymer film, polymer silk and polymer fiber contain 0.1-45 wt % crystalline aluminum phosphite, 55-99.9 wt % thermoplastic or thermosetting polymer or a mixture thereof, 0-44.9 wt % additive and 0-44.9 wt % filler or reinforcing material, where the total components are 100 wt %.

The flame retardant thermoplastic or thermosetting polymer molding material, polymer molding body, polymer film, polymer silk and polymer fiber contain 0.1-45 wt % flame retardant mixture; and the flame retardant mixture contains 0.1-50 wt % crystalline aluminum phosphite compound, 55-99.9 wt % flame retardant, 55-99.9 wt % thermoplastic or thermosetting polymer or a mixture thereof, 0-44.9 wt % additive and 0-44.9 wt % filler or reinforcing material, where the total components are 100 wt %.

Based on the flame retardant thermoplastic or thermosetting polymer molding material, polymer molding body, polymer film, polymer silk and polymer fiber, the flame retardant is dialkyl hypophosphorous acid and/or salts thereof; condensation products of melamine and/or reaction products of melamine and phosphoric acid and/or reaction products of the condensation products of melamine and polyphosphoric acid or a mixture thereof; nitrogenous phosphates; benzoguanamine, tri(hydroxyethyl) isocyanurate, allantoin, glycoluril, melamine, melamine cyanurate, dicyandiamide and/or guanidine, magnesium oxide, calcium oxide, aluminum oxide, zinc oxide, manganese oxide, stannic oxide, aluminum hydroxide, boehmite, dihydrotalcite, hydrocalumite, magnesium hydroxide, calcium hydroxide, zinc hydroxide, stannic oxide hydrate, manganese hydroxide, zinc borate, alkaline zinc silicate and/or zinc stannate.

Based on the flame retardant thermoplastic or thermosetting polymer molding material, polymer molding body, polymer film, polymer silk and polymer fiber, the flame retardant may be melam, melem, melon, dimelamine pyrophosphate, melamine polyphosphate, melam polyphosphate, melon polyphosphate and/or melem polyphosphate and/or a mixed polysalt thereof and/or ammonium hydrogen phosphate, ammonium dihydrogen phosphate and/or ammonium polyphosphate.

Based on the flame retardant thermoplastic or thermosetting polymer molding material, polymer molding body, polymer film, polymer silk and polymer fiber, the flame retardant may be a mixture of aluminum hypophosphite, zinc hypophosphite, calcium hypophosphite, sodium phosphite, monophenyl hypophosphorous acid and salts thereof, dialkyl hypophosphorous acid and salts thereof, monoalkyl hypophosphorous acid and salts thereof; adducts on 2-carboxyethyl alkyl hypophosphorous acid and salts thereof, 2-carboxyethyl methyl hypophosphorous acid and salts thereof, 2-carboxyethyl aryl hypophosphorous acid and salts thereof, 2-carboxyethyl phenyl hypophosphorous acid and salts thereof, DOPO and salts thereof, and p-benzoquinone.

Preferably, the crystalline aluminum phosphite and diethyl aluminum hypophosphite are compounded to be applied in glass fiber reinforced engineering plastics, comprising various kinds of nylon, polyesters and POK base materials.

The compound flame-retardant system of the crystalline aluminum phosphite and diethyl aluminum hypophosphite needs to be melted at high temperature via a double-screw extruder and mixed for dispersion when the system is applied in glass fiber reinforced engineering plastics.

Compared with the prior art, the present invention has the major advantages: the present invention provides a preparation method of a crystalline aluminum phosphite; aluminum hydrogen phosphite is reacted with a specific aluminum-containing compound under certain conditions and then subjected to specific high temperature post-processing to obtain the crystalline aluminum phosphite. Compared with the existing amorphous aluminum phosphite, the crystalline aluminum phosphite has a higher thermal decomposition temperature, lower water absorption and lower acidity. Therefore, the crystalline aluminum phosphite may be used as or used in the preparation of a flame retardant and a flame retardant synergist.

DETAILED DESCRIPTION OF THE EMBODIMENTS

The present invention will be further set forth in combination with the specific embodiments below. It should be understood that these embodiments are only used to illustrate the present invention, but not for the limitation of the scope of the present invention. The operating method not noted with specific conditions in the following examples is usually subjected to conventional conditions or the conditions recommended by a manufacturer.

Example 1 Preparation of a Crystalline Aluminum Phosphite

Preparation process was as follows: 270 g (1 mol) aluminum hydrogen phosphite (($H_2PO_3$)$_3$Al) and 630 g water were added to a 2 L reaction still, and fully stirred to be dissolved to obtain an aluminum hydrogen phosphite solution. 75 g aluminum sulfate was dissolved into 175 g water in a 500 mL beaker, then 8.1 g concentrated phosphoric acid ($H_3PO_4$) having a concentration of 85.1 wt % were added to an aluminum sulfate solution to be stirred fully and mixed evenly, then transferred to a dropping funnel. The reaction still was heated up to 90° C., and the aluminum sulfate solution containing phosphoric acid was added dropwisely and added completely within 2 h, and an alkali was added to adjust the pH value to 2.2, then the solution was kept warm for continuous reaction for 1 h. The reacted mixture was filtered while it was hot and a precipitate was washed repeatedly until washing effluent had a conductivity less than 50 μs/cm. The materials were transferred to a drying oven, and heated up to 120° C. and dried for 60 min; solids had a water content of 0.1 wt %; the dried solids were heated up to 180° C. at a rate of 2° C./min, kept for 60 min, and then heated up to 240° C. at a rate of 1° C./min, and kept for 60 min, then heated up to 300° C. at a rate of 2° C./min, and kept for 60 min, and cooled to room temperature and discharged; the materials were crushed; the mean grain size D50 was 38 μm, and the yield was 98.2%; and the materials were subjected relevant tests and application.

Figure 1:
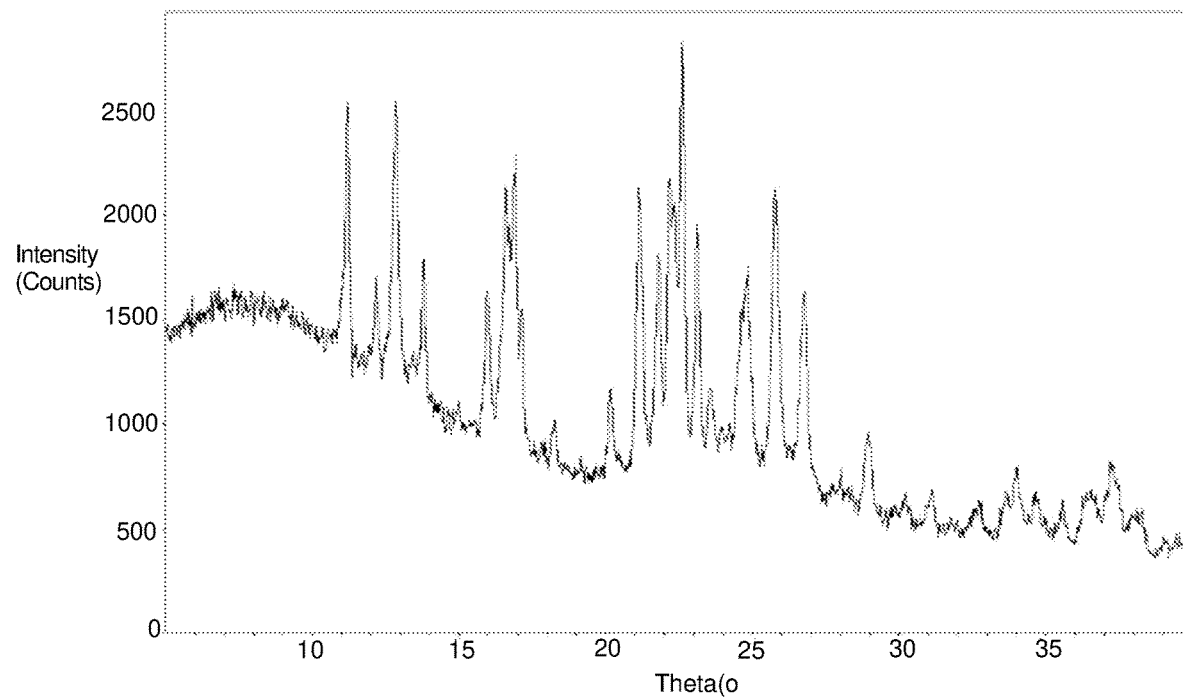
FIGS. 1 and 3 show an XRD pattern of a crystalline aluminum phosphite.
Figure 2:
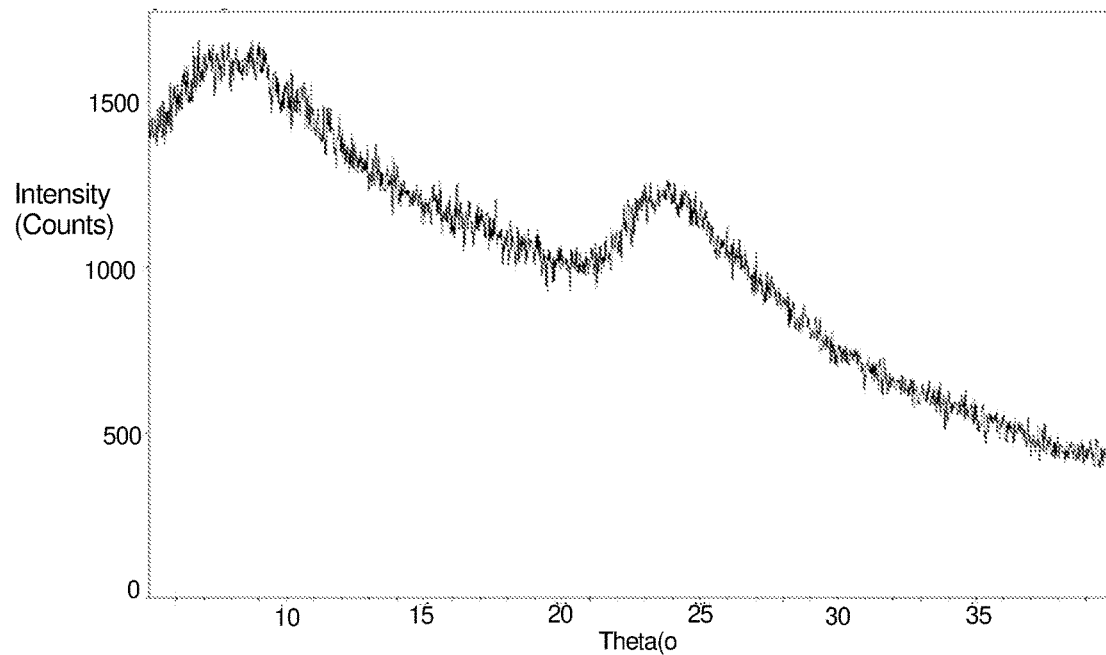
FIG. 2 shows an XRD pattern of an amorphous crystalline aluminumphosphite.

Test items and methods:
 a, the prepared compound was subjected to XRD analysis to determine whether the obtained compound is crystalline. If XRD pattern was close to FIG. 1, the obtained compound was considered to be crystalline; if XRD pattern was close to FIG. 2, the obtained compound was considered to be amorphous.
 b, test on water absorption: 50 g materials were weighed and put in a constant temperature humidity chamber under conditions of 85% humidity at 85° C., kept for 7 d to test the weight increment of the material; and the percentage of the weight increment was, namely, the water absorption of the material.
 c, test on the acidity of the prepared compound: 10 g powdered material was dispersed into 100 g water, and kept for 2 hr at a constant temperature of 25° C. to test a pH value of the solution.
 d, TGA was tested, and the temperature of 2 wt % weight loss served as a thermal weight loss temperature.

Figure 3:
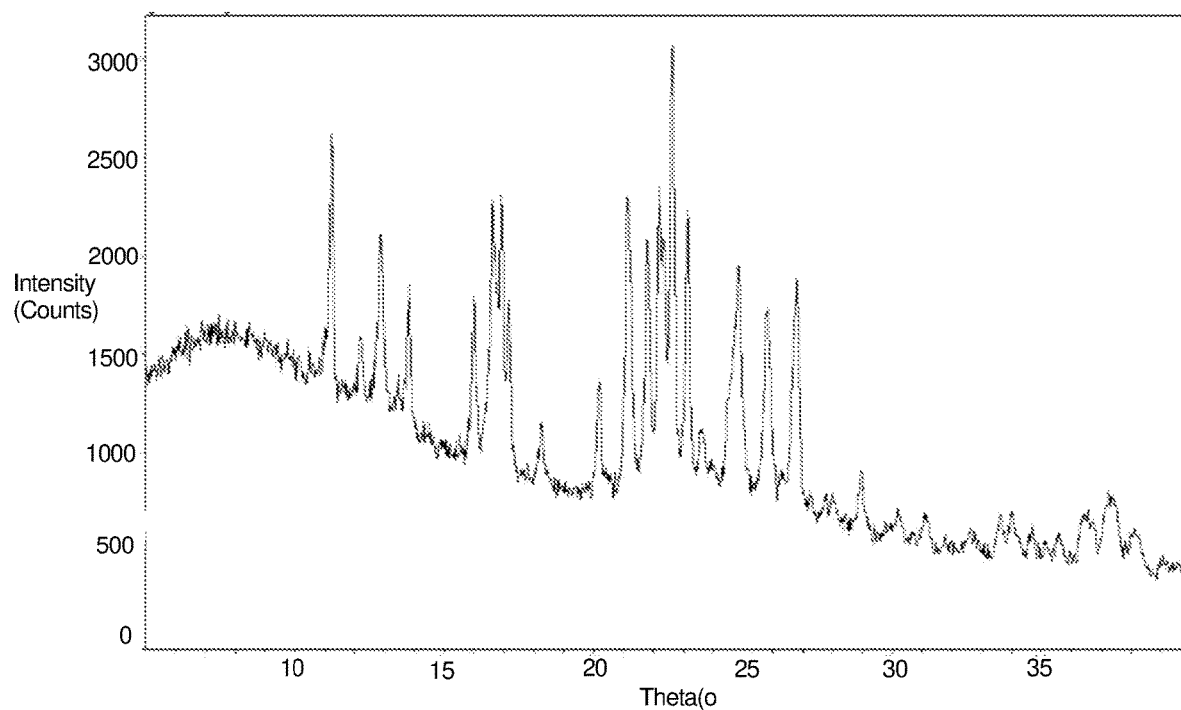

FIG. 3 shows an XRD result of the prepared aluminum phosphite.

XRD result indicated that the prepared aluminum phosphite was a crystalline form. Thermal weight loss, water absorption and pH value were shown in Table 2.

Example 2 Preparation of a Crystalline Aluminum Phosphite

Preparation process was as follows: 270 g (1 mol) aluminum hydrogen phosphite (($H_2PO_3$)$_3$Al) and 630 g water were added to a 2 L reaction still, and fully stirred to be dissolved to obtain an aluminum hydrogen phosphite solution. 78 g aluminum hydroxide was dispersed into 200 g water in a 500 mL beaker, then transferred to a dropping funnel. The reaction still was heated up to 90° C., and a suspension of aluminum hydroxide was added dropwisely and added completely within 2 h, and the pH value was adjusted to 2.6 by a solid aluminum hydroxide, then the solution was kept warm for continuous reaction for 1 h. The reacted mixture was filtered while it was hot and a precipitate was washed repeatedly until washing effluent had a conductivity less than 50 μs/cm. The materials were transferred to a drying oven, and heated up to 120° C. and dried for 60 min; solids had a water content of 0.1 wt %; the dried solids were heated up to 180° C. at a rate of 2° C./min, kept for 60 min, and then heated up to 240° C. at a rate of 1° C./min, and kept for 60 min, then heated up to 300° C. at a rate of 2° C./min, and kept for 60 min, and cooled to room temperature and discharged; the materials were crushed; the mean grain size D50 was 55 μm, and the yield was 99.3%; and the materials were subjected relevant tests and application. The thermal weight loss, water absorption and pH value were shown in Table 2.

Comparative Example 1

The preparation process of the Comparative Example 1 was the same as that in Example 1 except aluminum hydrogen phosphite was replaced with sodium phosphite to obtain the materials, XRD was tested, and the results indicated an amorphous structure. TGA, water absorption and pH value were tested and the results were shown in Table 2. The method is a preparation method of the existing crystalline aluminum phosphite.

Comparative Example 2

The preparation process of the Comparative Example 2 was the same as that in Example 1 except high temperature post-processing was not performed, materials were obtained, and XRD was tested, and the results indicated an amorphous structure. TGA, water absorption and pH value were tested and the results were shown in Table 2.

Comparative Example 3

The preparation process of the Comparative Example 3 was the same as that in Example 1 except high temperature post-processing was not performed, materials were obtained, and XRD was tested, and the results indicated an amorphous structure. TGA, water absorption and pH value were tested and the results were shown in Table 2.

TABLE 2

|  | Crystalline state | 2 wt % weight loss temperature (° C.) | Water absorption (%) | pH value |
|---|---|---|---|---|
| Example 1 | Crystalline | 442 | 0.12 | 3.0 |
| Example 2 | Crystalline | 443 | 0.10 | 3.1 |
| Comparative Example 1 | Amorphous | 425 | 0.50 | 2.6 |
| Comparative Example 2 | Amorphous | 280 | 0.80 | 2.3 |
| Comparative Example 3 | Amorphous | 265 | 1.05 | 2.1 |

It can be seen from the results of Table 2 that the aluminum phosphite prepared in the present invention is a crystalline aluminum phosphite, but an amorphous aluminum phosphite might be prepared only by the existing conventional process. Relative to amorphous aluminum hydrogen phosphite, the crystalline aluminum phosphite has a higher thermal decomposition temperature, lower water absorption and weaker acidity. These characteristics have obvious advantages for the amorphous aluminum hydrogen phosphite used as a flame retardant.

Application of a Flame Retardant

Example 3

52 wt % nylon 66, 30 wt % glass fiber, 3.4 wt % crystalline aluminum phosphite in Example 1 and 14.6 wt % diethyl aluminum hypophosphite (LFR8003, Jiangsu LiSiDe New Material Co., Ltd.) were prepared into a fire-retardant glass fiber reinforced nylon 66 by conventional regulations, and a sample was prepared to test the flame retardant property, and the flame retardant property of the material was up to UL94 V0 (0.8 mm).

Comparative Example 4

50 wt % nylon 66, 30 wt % glass fiber, 20 wt % diethyl aluminum hypophosphite (LFR8003, Jiangsu LiSiDe New Material Co., Ltd.) were prepared into a fire-retardant glass fiber reinforced nylon 66 by conventional regulations the same as those in Example 2, and a sample was prepared to test the flame retardant property, and the flame retardant property of the material was up to UL94 V2 (0.8 mm) (based on the flame-retardant grading standard of UL94, the flame retardant efficiency of grade V2 was inferior to that of grade V0).

Comparative Example 5

52 wt % nylon 66, 30 wt % glass fiber, 3.4 wt % crystalline aluminum phosphite in Example 1 and 14.6 wt % diethyl aluminum hypophosphite (LFR8003, Jiangsu LiSiDe New Material Co., Ltd.) were prepared into a fire-retardant glass fiber reinforced nylon 66 by conventional regulations the same as those in Example 2, and a sample was prepared to test the flame retardant property, and the flame retardant property of the material was up to UL94 V1 (0.8 mm) (based on the flame-retardant grading standard of UL94, the flame retardant efficiency of grade V1 was inferior to that of grade V0).

Comparative Example 6

52 wt % nylon 66, 30 wt % glass fiber, 3.4 wt % crystalline aluminum phosphite in Example 2 and 14.6 wt % diethyl aluminum hypophosphite (LFR8003, Jiangsu LiSiDe New Material Co., Ltd.) were prepared into a fire-retardant glass fiber reinforced nylon 66 by conventional regulations the same as those in Example 2, and a sample was prepared to test the flame retardant property, and the flame retardant property of the material was up to UL94 V2 (0.8 mm) (based on the flame-retardant grading standard of UL94, the flame retardant efficiency of grade V2 was inferior to that of grade V0 and grade V1).

Comparative Example 7

52 wt % nylon 66, 30 wt % glass fiber, 3.4 wt % crystalline aluminum phosphite in Example 3 and 14.6 wt % diethyl aluminum hypophosphite (LFR8003, Jiangsu LiSiDe New Material Co., Ltd.) were prepared into a fire-retardant glass fiber reinforced nylon 66 by conventional regulations the same as those in Example 2, and a sample was prepared to test the flame retardant property, and the flame retardant property of the material was up to UL94 V2 (0.8 mm) (based on the flame-retardant grading standard of UL94, the flame retardant efficiency of grade V2 was inferior to that of grade V0 and grade V1).

It can be seen from the application results that the crystalline aluminum phosphite of the present invention may be synergistic to diethyl aluminum hypophosphite to improve the flame retardant efficiency. Meanwhile, relative to the amorphous aluminum phosphite, the crystalline aluminum phosphite has better flame retardant efficiency when it is synergistic with diethyl aluminum hypophosphite, showing the advantages of the crystalline aluminum phosphite.

Moreover, it should be understood that a person skilled in the art may make various alterations or modifications to the present invention after reading the above description of the present invention, and these equivalent forms should fall within the scope of the claims of the present application.

The invention claimed is:

1. A method comprising the steps of:
   (1) preparing an aluminum-containing compound/water mixed solution containing an acid or free of an acid, then adding the mixed solution to an aluminum hydrogen phosphite solution at 80-110° C. to form a liquid mixture for reaction, and controlling the pH value of the liquid mixture to be less than 4 at the end of the reaction;
   wherein the aluminum-containing compound is at least one of aluminum sulfate, aluminum nitrate, aluminum chloride, aluminum hydroxide and aluminum oxide;
   (2) filtering the reacted mixture to obtain a precipitate and washing the precipitate until washing effluent has a conductivity less than 50 μs/cm;
   (3) heating and drying the washed precipitate at 100-130° C., such that the precipitate has a water content below 0.3 wt % below;
   (4) continuously heating the precipitate for dehydration reaction in an inert atmosphere or under vacuum conditions, with temperature rise not exceeding 350° C. within 5-10 h and temperature rise rate not exceeding 5° C./min, and finally cooling to obtain crystalline aluminum phosphite as the flame retardant or the flame retardant synergist.

2. The method according to claim 1, further comprising the step of incorporating crystalline aluminum phosphite into a polymer matrix to make a flame-retardant polymer molding material, a flame-retardant polymer film, or a flame-retardant polymer fiber.

3. The method according to claim 2, wherein the flame-retardant polymer molding material, the flame-retardant polymer film, or the flame-retardant polymer fiber comprises the following ingredients based on 100% by total weight:
55%-99.9% of the polymer matrix;
0.1%-45% of crystalline aluminum phosphite;
0-44.9% of a filler and/or a reinforcing material; and
0-44.9% of an additive.

4. The method according to claim 2, wherein the flame-retardant polymer molding material, the flame-retardant polymer film, or the flame-retardant polymer fiber comprises the following ingredients based on 100% by total weight:
55%-99.9% of the polymer matrix;
0.1%-45% of a flame-retardant system;
0-44.9% of a filler and/or a reinforcing material;
and 0-44.9% of an additive; and
the flame-retardant system comprises:
0.1%-50% of crystalline aluminum phosphite;
and 50%-99.9% of an additional flame retardant.

5. The method according to claim 4, wherein the additional flame retardant is a metal salt of diethyl hypophosphorous acid.

6. The method according to claim 3, wherein the polymer matrix is selected from the group consisting of nylon, polyester and POK.

7. The method according to claim 1, wherein in the step (1),
the acid comprises at least one of sulfuric acid, nitric acid, hydrochloric acid and phosphoric acid, and the acid is 2%-5% of the mass of the aluminum hydrogen phosphite;
in the mixed solution obtained by dispersing the aluminum-containing compound into water, the aluminum-containing compound has a mass concentration of 15%-50%;
in the aluminum hydrogen phosphite solution, the aluminum hydrogen phosphite has a mass concentration of 15%-50%;
when the aluminum-containing compound is at least one of aluminum sulfate, aluminum nitrate and aluminum chloride, the aluminum-containing compound/water mixed solution contains the acid; when the aluminum-containing compound is at least one of aluminum hydroxide and aluminum oxide, the aluminum-containing compound/water mixed solution is free of the acid;
the aluminum-containing compound/water mixed solution is added dropwisely to the aluminum hydrogen phosphite solution, and the total reaction time is 1-5 h;
the pH value of the liquid mixture is controlled by addition of an alkali or a metal oxide at the end of the reaction.

8. The method according to claim 1, wherein the crystalline aluminum phosphite has a particle size of 0.1-1000 μm, a water solubility of 0.01-10 g/L and a bulk density of 80-800 g/L.

* * * * *